Nov. 28, 1961 L. J. SIRI 3,011,039
THERMOSTAT ADJUSTING DEVICE
Filed June 26, 1959 2 Sheets-Sheet 1
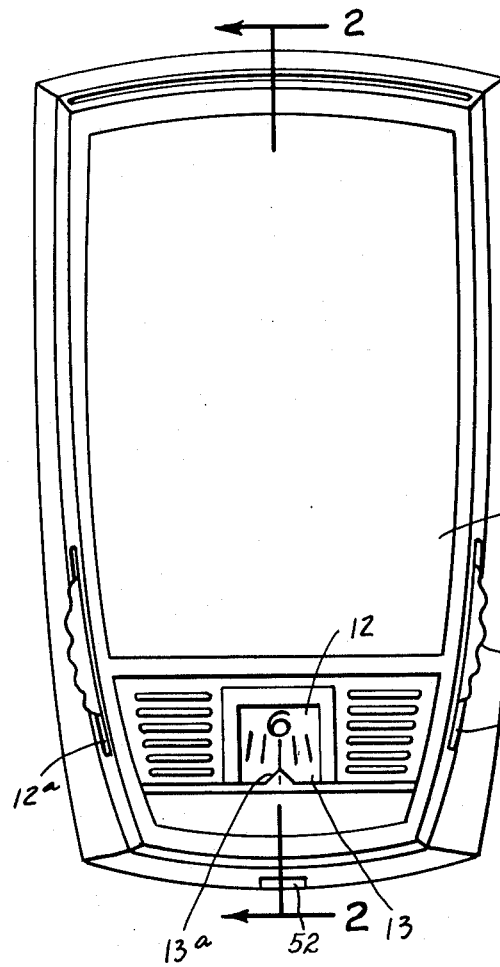
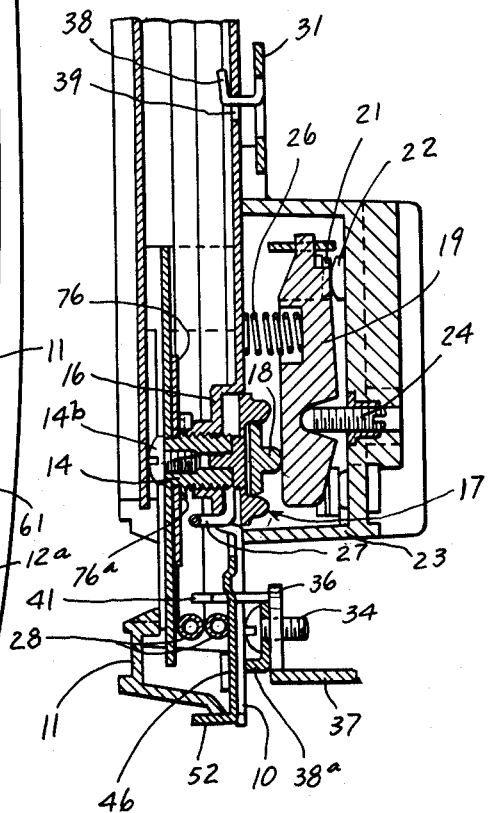
INVENTOR.
LOUIS J. SIRI.
BY
Lockwood, Woodard, Smith & Weikart.
ATTORNEYS.

Nov. 28, 1961 L. J. SIRI 3,011,039
THERMOSTAT ADJUSTING DEVICE
Filed June 26, 1959 2 Sheets-Sheet 2
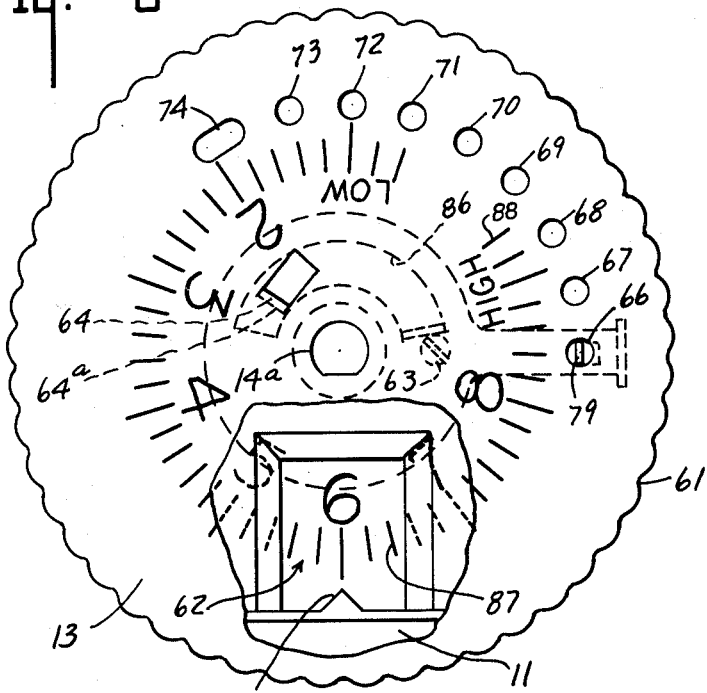
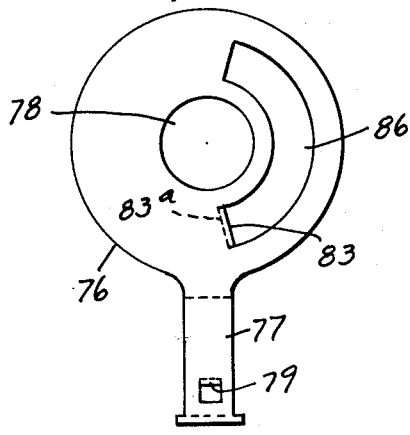 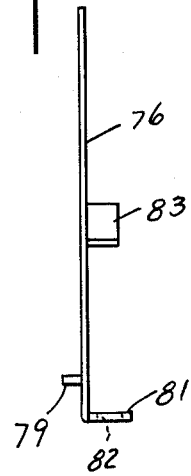
INVENTOR.
LOUIS J. SIRI.
BY
Lockwood, Woodard, Smith + Weikart.
ATTORNEYS.

United States Patent Office 3,011,039
Patented Nov. 28, 1961

3,011,039
THERMOSTAT ADJUSTING DEVICE
Louis J. Siri, South Bend, Ind., assignor to Penn Controls, Inc., Goshen, Ind., a corporation of Indiana
Filed June 26, 1959, Ser. No. 823,194
4 Claims. (Cl. 200—139)

This invention relates generally to thermostat adjusting devices and in particular to a construction in which the maximum temperature setting of the thermostat can be varied to suit the requirements of the particular thermostat installation.

This application is a continuation-in-part of my copending application Serial No. 790,219, filed January 30, 1959, now Patent No. 2,930,876, granted March 29, 1960, and titled "Control Mounting Assembly." Control devices such as thermostats used for controlling heating means for an enclosure, such as a room or rooms in a home or building, are conventionally provided with a stop somewhere in their control point adjustment mechanism which establishes the maximum temperature setting of the thermostat. In the case of electric heating particularly, because of varying building code requirements, the maximum temperature rise permitted with various construction materials, various conditions of use of the thermostat, or the like, no universal maximum temperature setting for all applications exists. It will be evident, therefore, that in providing a thermostat which can be universally used for all installations, it is highly desirable to provide a means in the thermostat which permits factory adjustment or adjustment by the installer of the maximum temperature setting of the thermostat.

It is an object, therefore, of the present invention to provide a thermostat adjusting device which includes a temperature setting dial manipulated to provide the control point setting of the thermostat, a fixed abutment and a lever carrying an abutment cooperating with the fixed abutment to establish the maximum temperature setting of the thermostat, the lever being pivotally mounted coaxially with the dial and detented at various positions with relation thereto to thereby vary the maximum control point setting of the thermostat depending on the selected detent position of the lever.

A further object of the present invention is to provide a simple inexpensive arrangement for selectively varying the maximum control point setting of a thermostat which, with the thermostat cover in place, is accessible, but hidden, so that only instructed personnel, such as the installer or service man, can make a change in the setting.

The full nature of the invention will be understood from the accompanying drawings and the following description and claims:

FIG. 1 is a top plan view of a thermostat embodying the present invention.

FIG. 2 is a fragmentary, sectional view taken generally along the line 2—2 of FIG. 1.

FIG. 3 is an enlarged front view of certain components of the thermostat.

FIG. 4 is a top plan view of a further component of the thermostat.

FIG. 5 is a side view of the component shown in FIG. 4.

Referring initially to FIGS. 1 and 2, there is shown an electric heating thermostat including a base plate 10 which supports the thermostat components the outer face of the plate being enclosed by a thermostat cover 11. The thermostat cover is apertured at 12 to provide visual access to a dial plate 13, and the dial plate has portions extending through slots 12a and is thus accessible for manipulation with the cover in place. The cover is also provided with a raised portion providing a reference marking 13a. The dial 13 is locked for rotation with a hub 14 which extends through the truncated central aperture 14a (FIG. 3) in the dial, a screw 14b threaded into the hub, serving to hold the dial in place. The hub is threaded into an aperture formed by outwardly flanged portions 16 of the base plate 10. The hub supports a liquid expansion power element indicated generally at 17, the power element having a thrust member 18 which bears against a switching lever 19. The switching lever is adapted to move a normally closed contact 21 with relation to a fixed contact 22, the lever 19 and accompanying switch structure being housed in a casing 23 mounted on and extending rearwardly from the base plate 10.

The switching lever 19 is calibrated by means of a screw 24 from the rear face of the casing 23, and a compression spring 26 causes the lever 19 to contact the thrust lever 18. The interior of the diaphragm type power element 17 is connected by means of a capillary tube 27 to a coiled bulb or enlarged tube 28. The bulb, capillary tube and diaphragm are filled with a fluid having an appreciable thermal coefficient of expansion whereby movement of the thrust member 18 is a direct function of the temperature of the fluid in the coiled bulb 28.

There is also provided a means for locking the base plate 10 to a wall plate or frame 31. The wall plate is provided with apertures which accommodate mounting screws 34 adapted to be threaded into conventional tabs 36 formed on a conduit box 37, one of which is visible in FIG. 2. Adjacent its upper end the wall plate 31 has upturned tabs 38 extending outwardly from the plate and received within apertures 39 in the base plate 10. The lower margin of the wall plate is flanged outwardly at 38a to space the lower portion of the thermostat base plate therefrom. Adjacent its lower end the wall plate 31 carries an outwardly extending tab 41, the tab extending freely through a slot formed in the base plate 10. A slidably movable locking member 46 extends slidably through an aperture in the tab 41. The lower end of the locking member extends slightly beyond the margin of the base plate and is bent outwardly to form a tab 52 which, as may best be seen in FIG. 1, is accessible from the front of the thermostat for sliding the locking member out of the tab 41. The locking member and accompanying parts form a convenient means for removing the thermostat from the wall plate 31 as described in detail in the aforementioned copending application.

The present invention is particularly concerned with the provision for a maximum control point or temperature setting for the dial 13. This structure will now be described in detail with reference to FIGS. 3 and 5. Referring initially to FIG. 1 and FIG. 3, it will be noted that the dial 13 is provided wtih serrated edges 61 which extend through appropriately positioned slots in the cover 11, whereby the dial may be rotated manually. The dial is further provided with index markings as indicated generally at 62, the markings cooperating with the reference marking 13a to indicate the setting or position of the dial. Numerals may also be provided adjacent certain lines of the index markings, these figures indicating numerically the extent of dial rotation. By reference to FIG. 2, it will be noted that as the dial is rotated clockwise, the power element 17 will be bodily moved away from the switching lever 19, thus raising the control point setting of the thermostat. Conversely, rotation of the dial in counterclockwise direction from its position in FIG. 3 will lower the control point setting of the thermostat.

A fixed abutment is provided by a screw 63 which is threaded into the flanged portion 16 of the base plate 10, the screw being visible in broken lines in FIG. 3, but not appearing in FIG. 2. Struck from the dial 13 and depending therefrom is a tab 64 whose leading face 64a engages the screw 63 defining the limit of counterclockwise rotation of the dial and thus the minimum control point setting of the thermostat. In the generally upper right-hand quadrant of the dial there are provided spaced apertures 66, 67, 68, 69, 70, 71, 72 and 73. There is also provided adjacent the aperture 73 an elongated aperture 74. The apertures are all spaced a uniform radial distance from the axis of rotation of the dial.

Underlying the dial is a maximum setting lever 76 shown in detail in FIG. 4. The lever has a circular central section and an extending portion 77. An aperture 78, located centrally within the lever, receives the hub 14, the lever abutting upon a shoulder 76a formed on the hub, as may be seen in FIG. 2. The lever lies directly beneath the dial, but is free to move with relation to the hub 14. The extending portion of the lever is provided with an upstanding tab 79, the tab being sized so as to extend through the selected one of the apertures 66–74. The extreme end of the lever 76 is provided with a downturned flange 81 having an aperture 82 therein. The aperture 82 accommodates a screwdriver head or similar tool. The tool may be inserted in the aperture to deform the lever downwardly slightly, permitting it to be pivotally moved in discrete increments, to thereby place the tab 79 in the selected one of the apertures 66–74. The central portion of the lever has struck therefrom a depending tab 83 whose leading face 83a is adapted to engage the screw 63 to define the limit of clockwise rotation of the dial. The portion of the lever adjacent the tab 83 is also provided with an arcuate aperture 86 to provide clearance for the tab 64 depending from the dial.

The apertures 66–74, together with the tab 79, may thus be seen to be a means for rotationally locking the lever 76 to the dial 13. With the tab 79 extending through aperture 66 in the dial, the tab 83 carried by the lever 76 will be engaged with the screw 63 when the dial is rotated clockwise to its position of FIG. 3. The maximum temperature setting, in this position of the lever 76, is thus a temperature whose magnitude is identified by the numeral 6 on the dial, as shown in FIG. 3. If the lever 76 is shifted with relation to the dial by an amount defined by the insertion of the tab 79 in the aperture 67, the tab 83 will be shifted from its position of FIG. 3 to permit the dial to be rotated counterclockwise to a point defined by the index marking indicated at 87.

Further shifting of the position of lever 76, as defined by the other apertures, will further shift the position of tab 83, permitting the dial to be rotated further in a clockwise direction. Thus, the maximum temperature setting which can be obtained by moving the dial may be conveniently varied merely by shifting the lever with relation to the dial. The aperture 74 is elongated to permit the lever to be shifted so that the trailing edge of the tab 83 engages the trailing edge of the tab 64, the tab 64 thus defining the highest maximum setting which can be obtained on the dial. Thus, with the tab 79 extending through the aperture 74, the highest maximum setting can be obtained and the dial can be rotated clockwise until the index marking indicated at 88 is aligned with the reference marking 13a. The arcuate aperture 86 in the lever 76 prevents the tab 64 from interfering with the relative motion of the dial and lever as the lever is shifted.

It should be noted that the maximum control point setting can be varied without removing the cover 11, this being possible because of the accessibility of the flange 81 and aperture 82 through the slot 12a. To perform the maximum control point setting, the dial is initially rotated clockwise (as viewed in FIG. 3) to the highest setting permitted by the relative position of the lever and dial. This brings the flange 81 and aperture 82 in line with the right-hand one of the slots 12a in the cover. A tool such as a screwdriver is then inserted beneath the dial into aperture 82 and the extending portion 77 is moved downwardly sufficiently to remove tab 79 from the dial aperture. The dial may then be rotated in either direction until the desired maximum control point setting registers with the index marking 13a. The extending portion 77 of the lever may then be released, permitting the tab 79 to snap into the appropriate dial aperture. Thus, while the maximum control point setting can be made without removing the thermostat cover, such setting procedure will be non-evident to other than previously instructed personnel.

While the invention has been disclosed and described in some detail in the drawings and foregoing description, they are to be considered as illustrative and not restrictive in character, as modifications may readily suggest themselves to persons skilled in this art and within the broad scope of the invention, reference being had to the appended claims.

The invention claimed is:

1. In a temperature responsive switching mechanism having a base plate, a switching device and a temperature responsive element for operating the switching device, an adjusting dial rotatably supported in spaced parallel relation to the base plate, a cover member substantially enclosing said dial and supported on the base plate, said cover having a slot therein through which a portion of said dial is accessible for manipulation, said dial having control point indicia thereon, said cover having a reference marking cooperating with said dial indicia, said dial having an operative connection with the temperature responsive element whereby manipulation of said dial adjusts the control point of the switching mechanism with said reference marking visually indicating the control point, a fixed abutment extending from the base plate adjacent the under face of said dial, a tab struck from said dial and depending therefrom to cooperate with said abutment in establishing a minimum control point position for said dial, a lever mounted for pivotal movement coaxially with said dial and extending radially along the under face thereof, an abutment depending from said lever and cooperating with said fixed abutment, and means for rotatably locking said lever to said dial at selected relative positions, said means comprising spaced apertures in said dial located at a uniform radial distance from the axis of rotation of the dial and a further abutment carried by said lever adapted to extend into a selected one of said dial apertures, said lever being accessible through said cover member slot for movement to the selected aperture, whereby the selected relative position of said lever and dial determines the maximum control point setting of said dial.

2. In a temperature responsive switching mechanism including a switching device and a temperature responsive element for operating the switching device, an adjusting dial rotatably supported adjacent said temperature responsive element, said dial having control point indicia thereon, a fixed reference marking cooperating with said dial indicia, said dial having an operative connection with the temperature responsive element whereby manipulation of said dial adjusts the control point of the switching mechanism with said reference marking visually indicating the control point, a fixed abutment extending adjacent one face of said dial, a tab carried by said dial and cooperating with said abutment in establishing a minimum control point position for said dial, a lever mounted for pivotal movement coaxially with said dial and extending radially along the other face thereof, an abutment carried by said lever and cooperating with said fixed abutment, means for rotatably locking said lever to said dial at selected relative positions, whereby the selected relative position of said lever and dial determines the maximum control point setting of said dial and a cover hiding from normal visual observation said dial except a portion thereof which is accessible for manipulation by extending through a slot means in said cover and except said indicia which are visible through an aperture in said cover, said lever, said tab, said abutments, and said means for rotatably locking said lever to said dial.

3. A claim in accordance with claim 2 wherein said lever is accessible through said slot means for unlocking said lever from said dial, moving said lever relative to said dial, and relocking said lever to said dial.

4. In a temperature responsive switching mechanism the combination of a switching device operated by a temperature responsive element, a manually operated dial controlling the switching point of said switching mechanism, a lever, a locking means for rotatably locking said lever to said dial, a limit means mounted on said lever to stop the rotation of said lever, a cover having an aperture means for manually rotating said dial and for rotatably positioning said lever relative to said dial, said cover hiding from normal visual observation said lever, said locking means and said limit means.

References Cited in the file of this patent

UNITED STATES PATENTS

| | | |
|---|---|---|
| 1,848,815 | Andersson | Mar. 8, 1932 |
| 2,298,823 | Crum | Oct. 13, 1942 |
| 2,562,425 | Huck | July 31, 1951 |
| 2,806,924 | Olson | Sept. 17, 1957 |